Oct. 19 1948.   K. C. ATKIN   2,451,650
PISTOL GRIP MOTOR CASING
Filed July 11, 1945
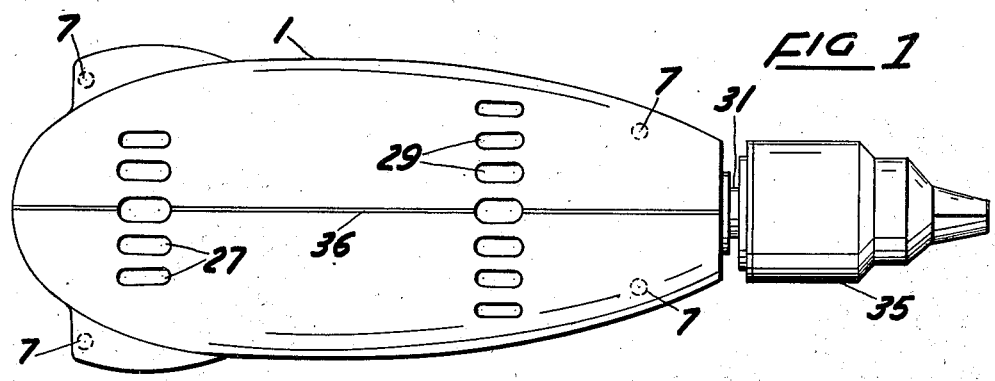
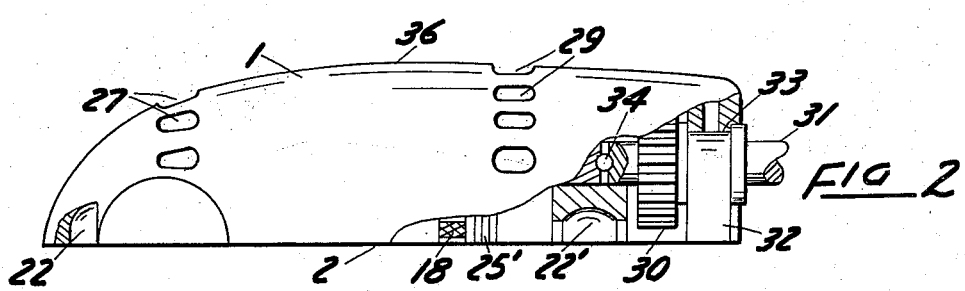
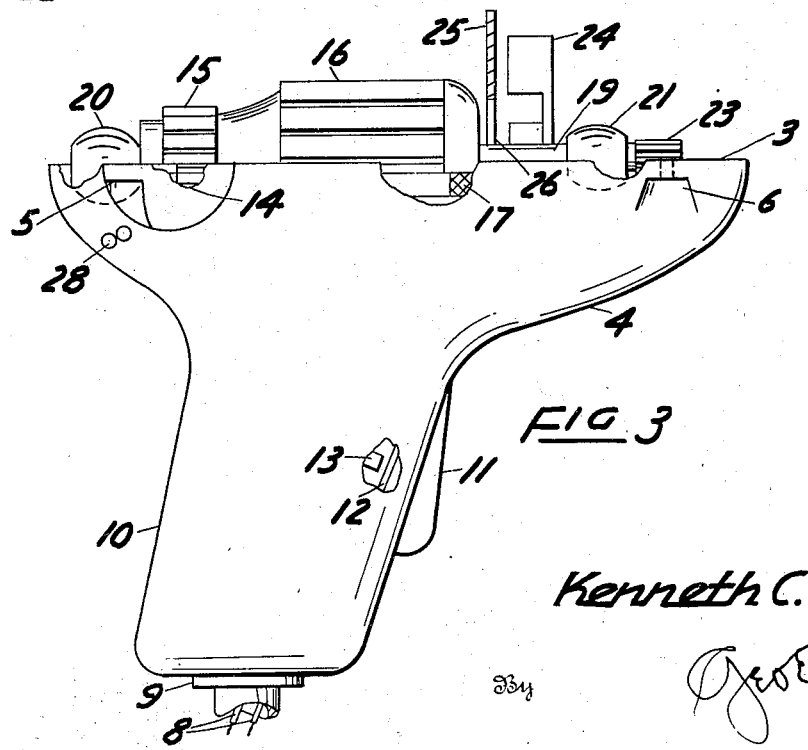
Inventor
Kenneth C. Atkin Patented Oct. 19, 1948

2,451,650

UNITED STATES PATENT OFFICE 2,451,650

PISTOL GRIP MOTOR CASING

Kenneth C. Atkin, Toledo, Ohio

Application July 11, 1945, Serial No. 604,439

2 Claims. (Cl. 172—36)

This invention relates to hand directed and poised prime movers, especially for power tools of rotation.

This invention has utility when incorporated in a fire-arm pistol-simulating housing, wherein the grip is the hand-hold directing means and the muzzle has a protruding rotary shaft for chuck or other manner of tool mounting or attachment.

Referring to the drawings:

Fig. 1 is a plan view of the housing provided with a chuck for assembling a rotary tool therewith, as a drill or bit;

Fig. 2 is a side elevation, with a portion broken away, of the top section of the housing of Fig. 1; and Fig. 3 is a side elevation, with fragments broken away, of the complementary or lower portion of the pistol housing for assembly with the housing of Fig. 2, the power and transmission mechanism being shown in association therewith.

A main or top housing section 1 has a lower plane or base seat 2 adapted to register with a complementary base plane or seat 3 of a lower housing section 4. Streamlined therewith are flush lugs 5, 6, thru which assembly bolts 7 may be inserted in anchoring together the sections 1, 4, into a symmetrical pistol-like unit.

Electric power supply lines 8 enter thru a fitting 9. The fitting 9 is of a form to provide a grip 10 for directing the section 4. A trigger 11 may be operated as grasped to close a switch at terminals 12, 13, for the lines 8 to complete a circuit thru brushes 14 at a commutator 15 of a motor rotor 16 which armature has field portions 17 in the section 4 and 18 in the section 1.

The rotor 16 is on a shaft 19 in spheric type rocking bearings 20, 21. The housing 1 has a complementary seat 22, for the bearing 20, and a complementary seat 22' for the bearing 21. Beyond the bearing 21 as remote from the armature 16, the shaft 19 has a pinion 23. On the opposite side of the bearing 21, a blade device or fan 24 as a centrifugal blower, is spaced by a diaphragm 25 from the armature 16. A central opening 26 in the diaphragm or partition 25 is in an air cooling circuit for the motor. Air may be drawn in thru ports 27 in the section 1 top, or ports 28 therebelow in the section 4. The incoming air is adjacent the bearing 20 and commutator 15, and from thence may pass about the rotor 16, thru the opening 26, to be outwardly thrown by the blades of the fan 24 for discharge at ports 29.

For transmission, the pinion 23, in the assembly of the sections, is in mesh with a gear 30 fast on a shaft 31. The shaft 31 and the gear 30, as a unit are on a bearing 32, which is located in a seat 33 of the section 1, and the shaft 31 has a thrust bearing 34. Accordingly, a chuck 35 fixed with the shaft 31, is used to thrust or push a tool into work, there is anti-friction bearing 34 to respond thereto.

In the assembly of the sections 1, 4, the diaphragm 25 enters a seat 25' in the section 1, in completing the partition holding of the diaphragm 25. There is but the single housing parting for the sections 1, 4, at the abutting endless peripheral seat regions 2, 3. Production line assembly is rapid, as the rotor 16 and the shaft 19, together with the bearings 20, 21, partition 25, are assembled in the section 4. The bearing 32, with the tool shaft 31 and the gear 30, are also pre-assembled in the housing section 1. The unit with the bearing 32 is placed in the seat 33 and is upward from and flush with the seat 2. The sections 1, 4, are then brought together with the seats 2, 3, in register. Accordingly the seat 3 is against the flat lower side of the bearing 32. The four bolts 7 complete the assembly.

As a sight line, medially over the housing top 1, is a marker identity or rib 36.

The general appearance of the housing pair 1, 4, is that of an automatic pistol. The motor-bounding seats 2, 3, as each lying in a plane and peripherally endless, define that plane as extending in a barrel-wise direction, were the unit considered a firearm. The trigger-simulating switch 11, contributes to the ease for control, as to having the motor operate or idle. The general streamline exterior is a factor of value for working into close places, with avoidance of hindrances. By locating the work shaft 31 parallel to the axis of the motor and on the side thereof away from the grip 10, there is a factor of mechanical balance contributing to ease in handling by the operator.

When abutting, the complementary seats 2, 3, determine a common plane, approximately that of the diameter of the rotor 16 and axially extending.

What is claimed and it is desired to secure by Letters Patent is:

1. A pistol type electric motor hand tool comprising a major housing section providing a complete tool-directing grip portion, there being, lengthwise of said section oppositely from the grip portion, an endless seat having a planar face, a motor shaft having its axis in the plane of said seat, a pair of aligned bearings for the shaft, within the bounds of said seat said major housing section having re-entrant clearance in which said bearings are nested to extend upwardly from the plane of said seat, a minor complementary housing section having a planar face endless seat in register with the major section seat, said minor section being recessed in completing nesting of the bearings, a motor field having one portion nested in the major section and a second portion nested in the minor section, a motor rotor carried by the shaft between the bearings and enveloped by the field portions, and a tool mounting transmission in the minor section and connectable with the motor from assembly of the sections.

2. An electric hand tool comprising an electric motor rotor, an electric field having portions surrounding the rotor, an axial shaft for the rotor, aligned bearings for the shaft, a transmission offset from the shaft, a tool mounting connected to the transmission, and a housing grip portion extending to form a major section with a planar face endless seat providing bounds for a re-entrant region having nest portions for the bearings to project upward therefrom in locating the shaft axis approximately in the plane of said face, and a housing cap section in register with the planar face seat of the major section and completing enveloping of the rotor, bearings and shaft, there being one field portion in each section, said cap section locating the transmission and tool mounting to be thereby connected to the motor rotor.

KENNETH C. ATKIN.

REFERENCES CITED

The following references are of record in the file of this patent:

UNITED STATES PATENTS

| Number | Name | Date |
|---|---|---|
| 2,083,405 | Schick | June 8, 1937 |
| 2,373,842 | Mitchell | Apr. 17, 1945 |

FOREIGN PATENTS

| Number | Country | Date |
|---|---|---|
| 470,690 | Great Britain | Aug. 19, 1937 |
| 825,304 | France | Mar. 1, 1938 |